United States Patent [19]

Hara

[11] 4,249,433
[45] Feb. 10, 1981

[54] SHEATHED WIRE END PORTION PROCESSING MACHINE

[75] Inventor: Akinori Hara, Tokyo, Japan

[73] Assignee: Osawa Press Mfg. Co., Ltd., Tokyo, Japan

[21] Appl. No.: 26,786

[22] Filed: Apr. 4, 1979

[30] Foreign Application Priority Data

Sep. 7, 1978 [JP] Japan .................................. 53-109893

[51] Int. Cl.³ .............................................. H02G 1/12
[52] U.S. Cl. ..................................................... 81/9.51
[58] Field of Search .......................... 29/33 F; 81/9.51

[56] References Cited

U.S. PATENT DOCUMENTS

| | | | |
|---|---|---|---|
| 3,309,948 | 3/1967 | Falken | 81/9.51 |
| 3,368,428 | 2/1968 | Gudmestad | 81/9.51 |
| 4,109,553 | 8/1978 | Drinkard, Jr. et al. | 81/9.51 |

Primary Examiner—James G. Smith

Attorney, Agent, or Firm—Kane, Dalsimer, Kane, Sullivan and Kurucz

[57] ABSTRACT

A sheathed wire end portion processing machine which performs operations of cutting the sheathed wire to the predetermined length and automatically peeling the sheathing material off at the least one of the portion of the cut sheathed wire and the portion of the residual sheathed wire is provided in accordance with the present invention. Advantageously the sheathed wire end portion processing machine can locate the sheathed wire exactly at the predetermined cutting position. Further the machine can cut the sheathed wire to a correct and constant length. Still further this machine can displace the cut and peeled wire to the predetermined position such as clamp terminal fastening device, after peeling the sheathing material off at the least one of the portion of the cut sheathed wire and the portion of the residual sheathed wire.

9 Claims, 14 Drawing Figures

SHEATHED WIRE END PORTION PROCESSING MACHINE

BACKGROUND OF THE INVENTION

The present invention relates to a sheathed wire end portion processing machine that performs operations of cutting the sheathed wire to the predetermined length and automatically peeling the sheathing material off at the least one of the portion of the cut sheathed wire and the portion of the residual sheathed wire.

Hitherto, when fastening a clamp terminal onto a sheathed wire, man cuts the sheathed wire to the predetermined length and then peels manually the sheathing material off the end portion of the cut sheathed wire. As a result it takes long time till he completes operations. In view of a fact that manpower cost has been remarkably increased in these days, it is pointed out that conventional operations are very ineffective and expensive.

Moreover since the sheathed wire is usually wound about a bobbin or cylinder, it passes through a straightening device to eliminate the inherent curvature of the sheathed wire prior to cutting the same to the predetermined length in a cutting device. A problem is that man can eliminate substantially a small radius curvature of the sheathed wire but he fails to do so with a large radius one. This means that cutting is performed without complete elimination of wire curvature, resulting in undesirable end inconstant cut portion of the sheathed wire due to inclined cutting operation, as typically illustrated in FIG. 1. As a result a clamp terminal is automatically fastened to the cut sheathed wire by means of a clamp terminal fastening device only with inexactness and inconstancy.

OBJECT OF THE INVENTION

A main object of the invention is to provide a sheathed wire end portion processing machine in which the sheathed wire is cut exactly to the predetermined length and the sheathing material at the end portion thereof is completely peeled off without any drawback inherent to the conventional operations.

Other object of the present invention is to provide a sheathed wire end portion processing machine in which the sheathed wire is smoothly forwarded in the predetermined direction therethrough for long period of time.

Another object of the present invention is to provide a sheathed end portion processing machine in which the sheathed wire can be located exactly at the predetermined cutting position so as to ensure constant length of cut sheathed wire.

Still another object of the present invention is to provide a sheathed wire end portion processing machine by which the end portion of the cut sheathed wire is automatically forwarded to other place such as clamp terminal fastening device in an effective manner.

Other objects and advantageous feature of the present invention will be in part apparent and will be in part understood from the following description taken in connection with the accompanying drawings.

To accomplish the objects as mentioned above, a new and unique sheathed wire end portion processing machine is proposed in accordance with the present invention, which comprises a forwarding device for forwarding the sheathed wire by the predetermined length, a cutting device with cutters arranged on the forwarding side of the said forwarding device and strip cutters arranged on the both sides of and adjacent to the said cutters respectively, a first clamping device arranged intermediate the forwarding device and the cutting device, a first moving device for displacing the said first clamping device from the said cutting device along the passage of the sheathed wire, a second clamping device arranged on the wire outlet side of the cutting device and a second moving device for displacing the said second clamping device away from the said cutting device along the passage of the sheathed wire. An advantage with the sheathed wire end portion processing machine of the present invention is that the sheathing material at the end portion of the cut sheathed wire can be automatically peeled off.

In accordance with a preferred embodiment of the present invention a third clamping device is mounted on the wire inlet side of the said forwarding device and this third clamping device is constructed such that the same clamps the sheathed wire and thereafter the said first clamping device clamps the sheathed wire. Another advantage with this sheathed wire end portion processing machine is that the sheathed wire can be located exactly at the predetermined cutting position.

In accordance with another preferred embodiment of the present invention the said second clamping device is provided with a pair of clamping members which are arranged on the both upper and lower sides of the passage of the sheathed wire in such a manner that one is moved toward or away from the other, and a guide member with a substantially inverted V-shaped notch located in the rear side of the said clamping members. Other advantage with the sheathed wire end portion processing machine is that the sheathed wire can be located exactly at the predetermined cutting position.

Further in accordance with another preferred embodiment of the present invention at the least one of the said first and second moving devices is constructed such that the same parts the corresponding clamping device away from the said cutting device and thereafter displaces this clamping device to the predetermined position. Still another advantage with the sheathed wire end portion processing machine is that the end portion of the cut sheathed wire can be automatically delivered to the predetermined position such as clamp terminal device in an effective manner.

BRIEF DESCRIPTION OF THE ACCOMPANYING DRAWINGS

Now the present invention will be described in more detail with reference to the accompanying drawings illustrating a preferred embodiment of the invention, in which.

DETAILED DESCRIPTION OF THE INVENTION

Figures 1, 3:
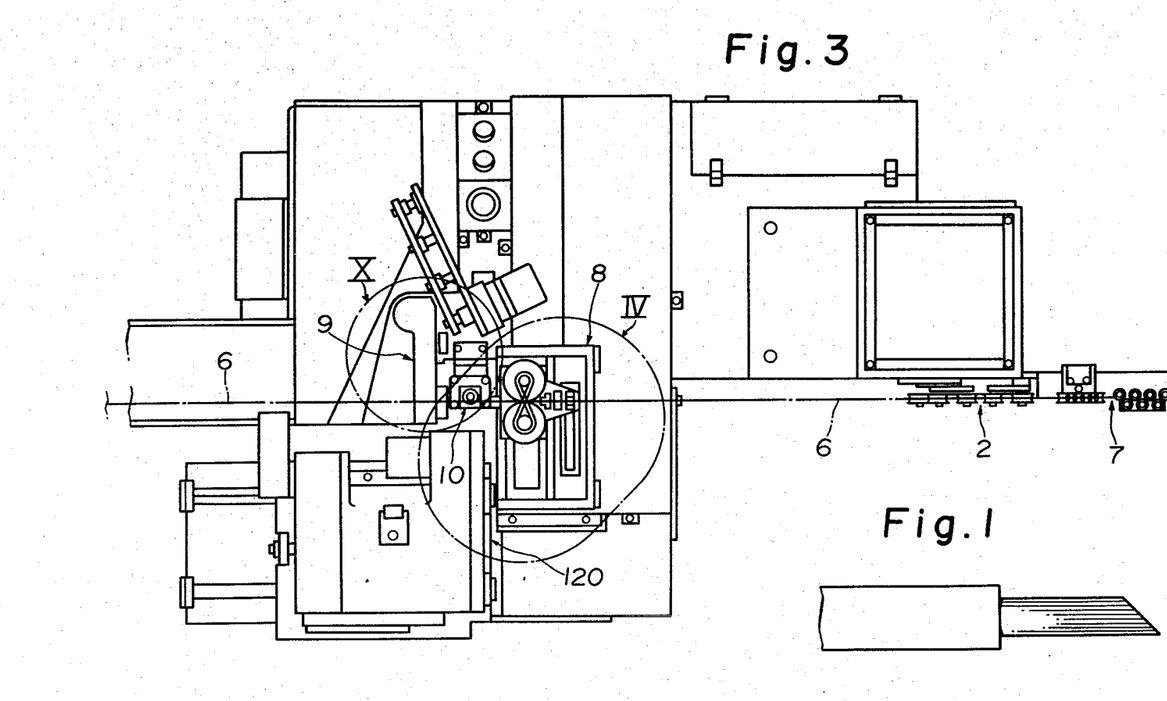
FIG. 1 is a side view of a typical sheathed wire processed with the conventional method of this kind, as shown in an enlarged scale.
FIG. 3 is a plan view of the machine in FIG. 2.
Figure 2:
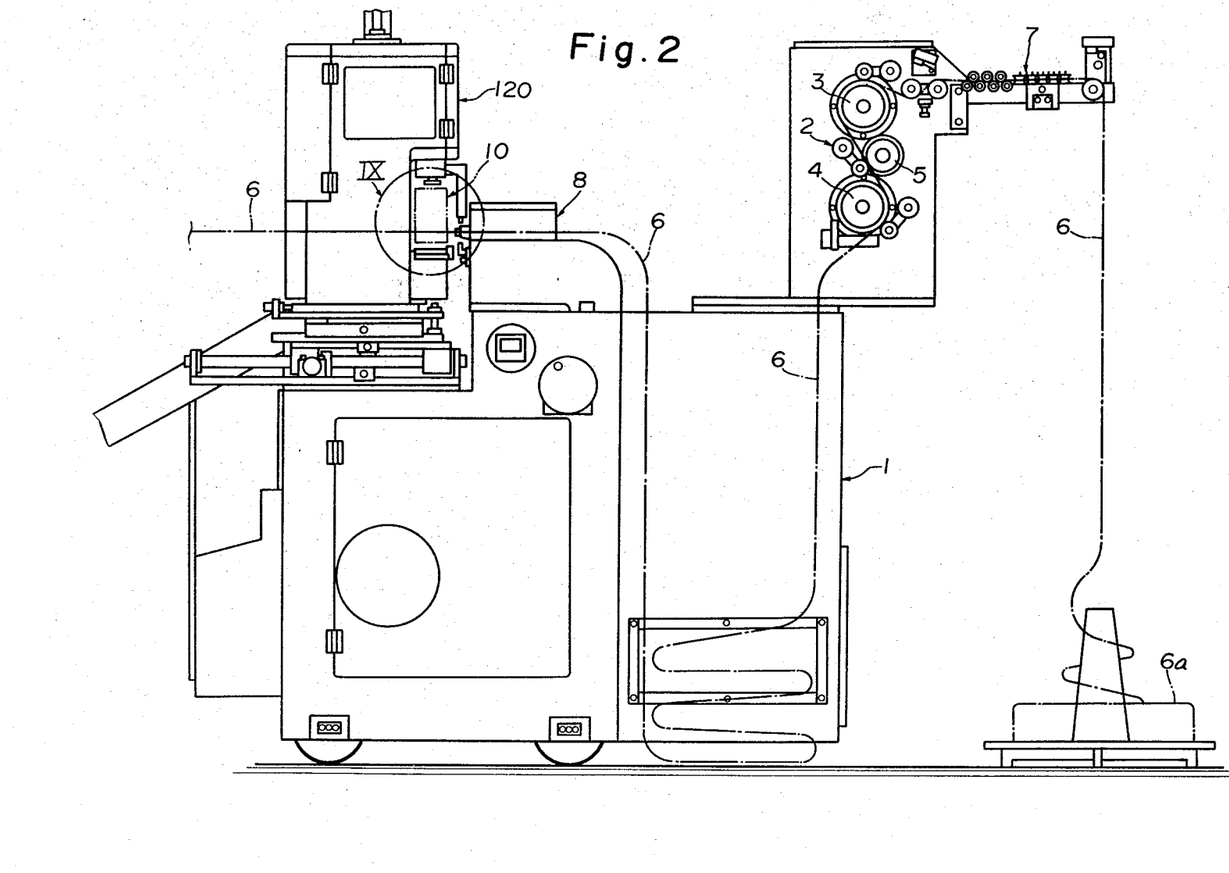
FIG. 2 is a schematic front view of the embodiment of a sheathed wire end portion processing machine in accordance with the present invention.

Referring to FIG. 2 and 3, the reference numeral 1 denotes a frame of the machine, on which a length measuring device 2 is mounted in place. This length measuring device 2 is provided with a driving pulley 3, a driven pulley 4 and an encorder 5 arranged therebetween. The length measuring device 2 is constructed in such a manner as to measure the length of the sheathed wire which has been delivered through the wire straightener 7 from the sheathed wire coiler 6a and thereafter forward the measured length of the sheathed cable 6 to the next step.

A first moving device 8 and a second moving device 9 are mounted in the predetermined position on the said frame 1 respectively and further a cutting device 10 is disposed intermediate the said moving devices 8 and 9. These moving devices will be described in detail below.

First the first moving device 8 will be described with reference to FIG. 4 to 8. On the said frame 1 is arranged a guide member 20. Further on the guide member 20 is formed a guide groove 21 which extends at a right angle to the passage of the sheathed wire 6. A moving body 22 is mounted in the said guide groove 21 displaceably in the both directions marked with "A" and "B" (see FIG. 4). As the rod end 23 connected to the moving body 22 is displaced in the direction marked with "A" or "B" by means of a driving power source (not shown), the said moving body 22 is also displaced in the same direction as that of the said rod end 23. On the said moving body 22 is formed a guide groove 24 which extends in parallel to the passage of the sheathed wire 6. In the said guide groove 24 is provided a table 25 which is arranged displaceably in the directions as marked with "C" and "D". Beneath the said table 25 is disposed a guide roller 26. This guide roller 26 is inserted displaceably within the guide groove 28 of the swinging body 27. The said swinging body 27 is mounted rotatably about the axle 29 on the frame 1. As the rod end 30 connected to the said swinging body 27 is displaced in the direction as marked with "E" or "F" by means of a driving power force (not shown), the swinging body 27 is rotated in the clockwise or anti-clockwise direction in FIG. 4 so that the said table 25 is displaced in the direction marked with "C" or "D".

Figure 4:
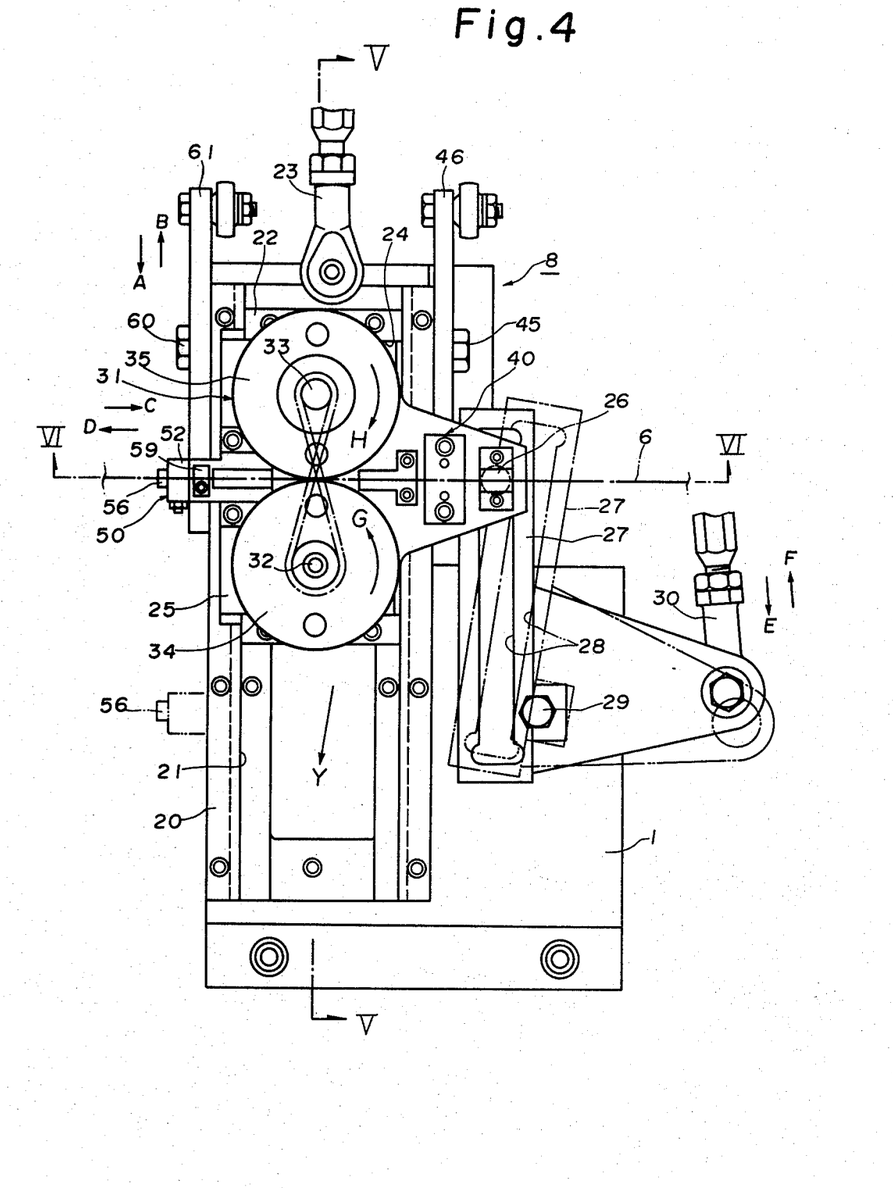
FIG. 4 is an enlarged plan view of a portion of the machine as marked with circle "IV" in FIG. 3.
Figure 5:
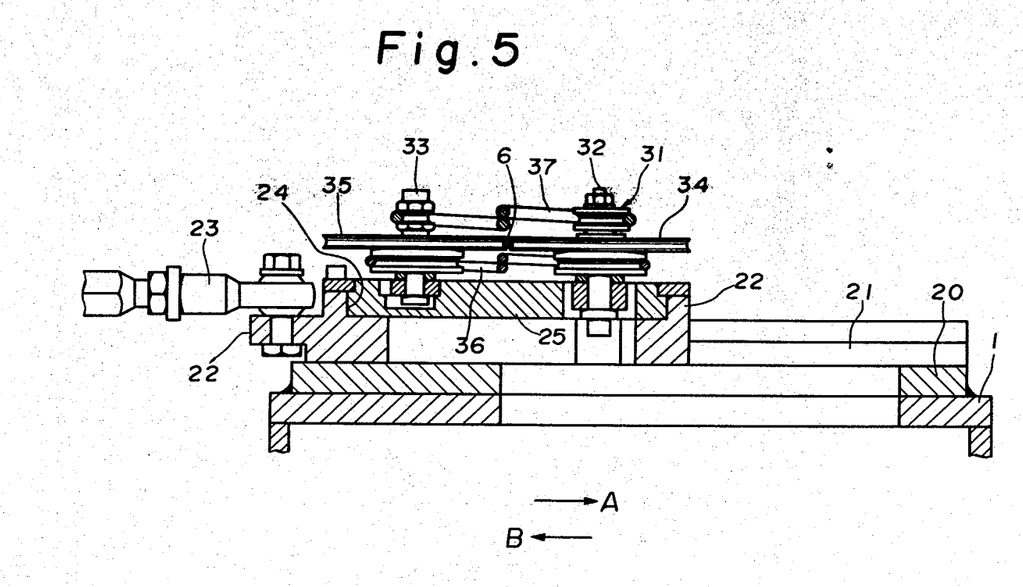
FIG. 5 is a vertical side view of the portion of the machine taken in line V—V in FIG. 4.
Figure 6:
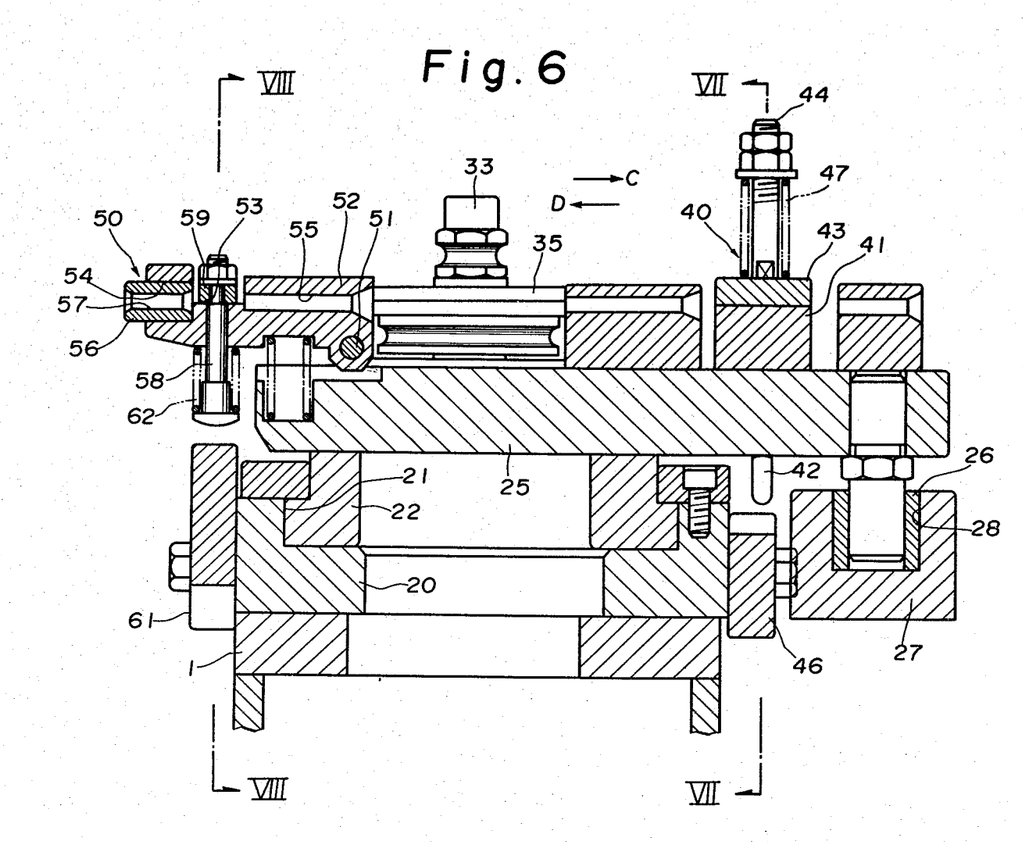
FIG. 6 is another vertical sectional side view of the portion of the machine taken in line VI—VI in FIG. 4.
Figure 7:
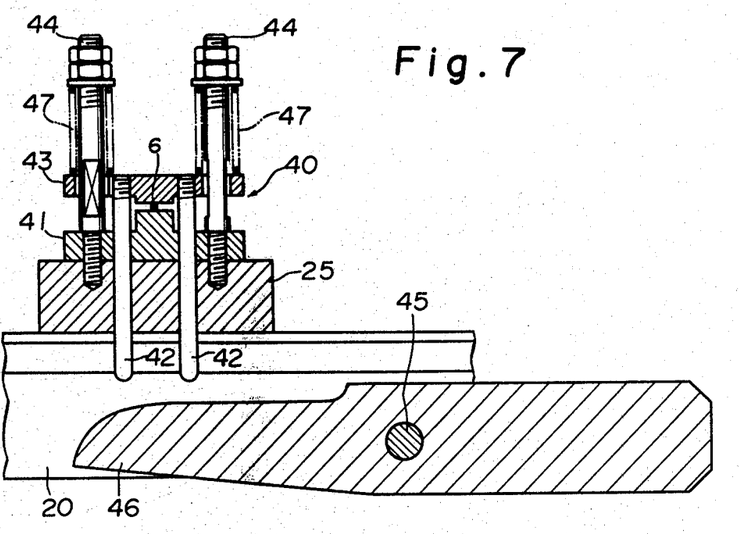
FIG. 7 is a more enlarged vertical sectional view of the portion of the machine taken in line VII—VII in FIG. 6, where a part thereof is taken away from illustration.
Figure 8:
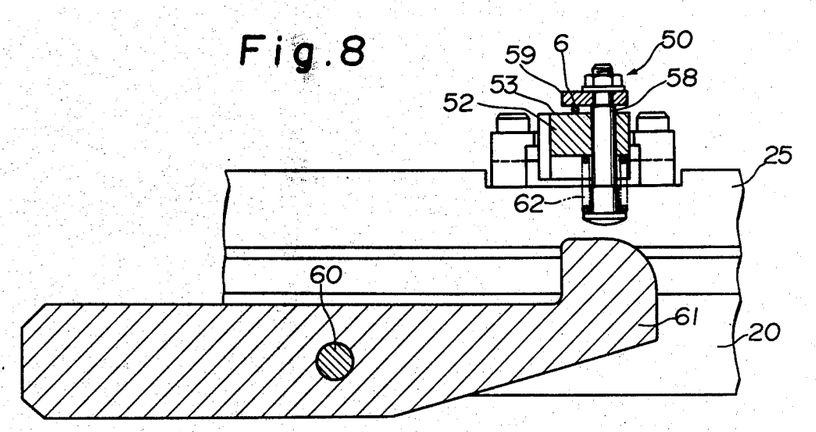
FIG. 8 is a vertical sectional side of the portion of the machine taken in line VIII—VIII in FIG. 6, wherein another part thereof is taken away from illustration.

On the said table 25 is provided a forwarding device 31 which comprises a driving pulley 34 and a driven pulley 35, both of which are mounted rotatably about the shafts 32 and 33 on the table 25. These pulleys 34 and 35 are adapted to be rotated in synchronization in the directions marked with "G" and "H" by means of the cross loaded belt 36. Further the said pulleys 34 and 35 are pushed toward each other with the aid of a spring 37 disposed therebetween. As the driving pulley 34 is rotated in the direction marked with "G" by means of a power source (not shown), the driven pulley 35 is rotated in the direction marked with "H", whereby the sheathed wire 6 clamped between the pulley 34 and 35 is forwarded in the direction marked with "D".

On the right portion of the said forwarding device 31 is mounted a clamping device 40 (see FIG. 4). This clamping device 40 is provided with a lower clamping member 41 on the table 25. Two pins 42 and 43 are arranged displaceably in the vertical direction through the said lower clamping member 41. These pins 42 and 43 are provided with an upper clamping member 43 connected thereto on the upper ends thereof. On the both sides of the upper clamping member 43 are provided stud bolts 44 which extend through the said upper clamping member 43, the lower portion of the said stud bolts 44 being fastened to the lower clamping member 41. Beneath the pins 42 and 43 is arranged a rotatable arm 46 which is rotated about a shaft 45 located within the guide member 20. As the said arm 46 is rotated in the clockwise direction in FIG. 7 by means of a driving power source (not shown), the pins 42 and 43 are lifted and thereby the upper clamping member 43 is parted away from the lower clamping member 41, while as the arm 46 is rotated in the opposite direction, the upper clamping member 43 is depressed against the lower clamping member 41 by means of the springs 47.

Further on the left portion of the forwarding device 31 is mounted a clamping device 50 which comprises a lower clamping member 52 which is adapted to be rotated about a shaft 51 disposed across the table 25. This clamping member 52 is formed with a clamping face 53 and on the both sides of the said clamping face 53 are provided holes 54 and 55 which extend horizontally. A cylindrical piece 56 is detachably inserted in the said hole 54 of the clamping member 52. The hole 57 of the said cylindrical piece 56 has a diameter a little larger than that of the sheathed wire 6. In this connection is to be noted that a plurality of cylindrical pieces 56 are prepared, which have the same outer diameter but different inner diameter of the hole 57 respectively, so that other size of sheathed wire 6 can pass therethrough. A pin 58 is provided in place on the clamping face 53, which extends in the vertical direction through the said clamping face 53. On the upper portion of the said pin 58 is mounted an upper clamping member 59. Beneath the said pin 58 is arranged an arm 61 which is adapted to be rotated about a shaft 60 located across the guide member 20. As the said arm 61 is rotated in the anticlockwise direction in FIG. 8 by means of a driving power source (not shown), the pin 58 is lifted and thereby the upper clamping member 59 is parted away from the lower clamping member 52. On the contrary, as the arm 61 is rotated in the opposite direction, the upper clamping member 59 is lowered by means of the spring 62 to abut against the clamping face 53 of the lower clamping member 53.

Figure 9:
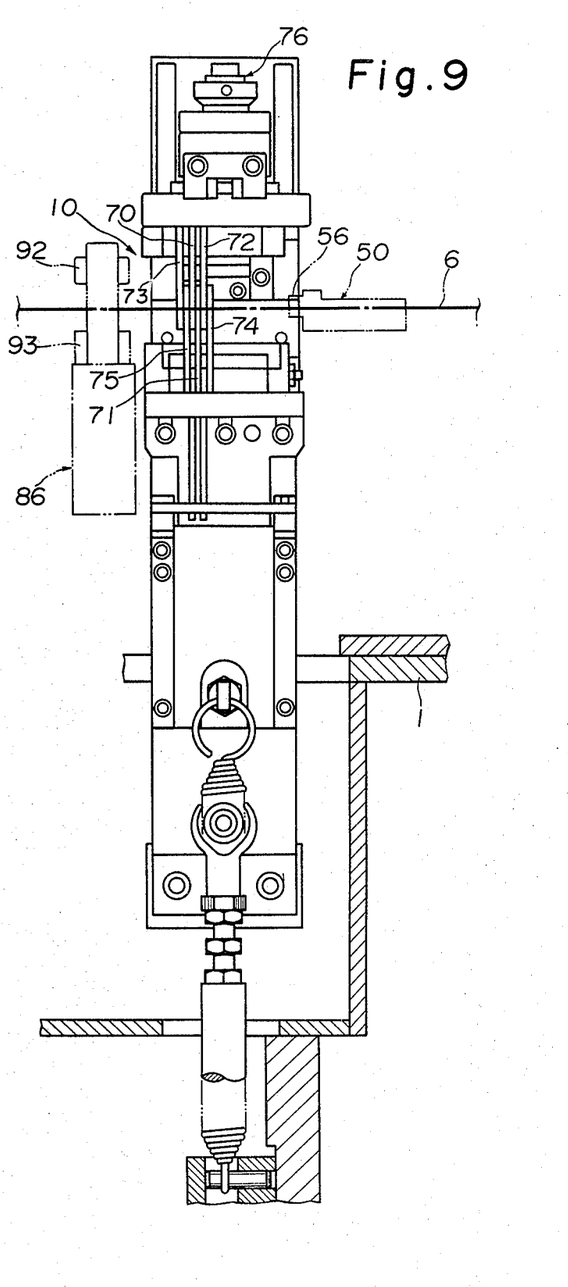
FIG. 9 is a partially cut away front view of the portion of the machine marked with circle "XI".

Next, the aforesaid cutting device 10 will be described in detail with reference to FIG. 9. This cutting device 10 is provided with an upper cutter 70 and a lower cutter 71, both of which are driven by means of a driving power source (not shown). Further the cutting device 10 is provided with a first upper strip cutter 72 and a second upper strip cutter 73, both of which are moved upward and downward together with the said upper cutter 70, while it is provided with lower strip cutters 74 and 75 which are moved upward and downward together with the said lower cutter 71. It is to be noted that the closest distance between the upper strip cutters 72, 73 and the lower strip cutters 74, 75 can be adjusted with the aid of the adjusting device 76.

Next, the aforesaid second moving device 9 will be described in detail with reference to FIG. 10 to 14. On the said frame 1 is provided a shaft 80 which stands upright therefrom. A rotating body 81 is mounted rotatably on the said shaft 80. When the rod end 82 secured to the said rotating body 81 is displaced in the direction marked with "M" or "N" with the aid of a driving power force (not shown), the rotating body 81 is rotated in the clockwise or anti-clockwise direction. The rotating body 81 is provided with a guide groove 83 in place, which extends in the direction at a right angle to the passage of the sheathed wire 6. Within the said guide groove 83 is mounted a moving body 84 which is arranged displaceably in the direction marked with "P" or "Q". As the rod end 85 secured to the said movable body 84 is displaced in the direction marked with "P" or "Q", the movable body 84 is displaced in the same direction as that of the said rod end 85.

On the said moving body 84 is mounted a clamping device 86 which is provided with a housing 86a fastened to the said moving body 84. Within the housing 86a are provided a first rack 87 and a second rack 88, the one being movable in the direction opposite to that of the other, wherein a pinion 90 is disposed rotatable about a shaft 89 located intermediate these racks 87 and 88. The first rack 87 is provided with a roller 91 at the lower portion thereof. Further the first rack 87 is provided with an upper clamping member 92 at the upper portion of the same. The second rack 88 is also provided with a lower clamping member 93 at the upper portion thereof. Beneath the said roller 91 is located a round rod 94 which is connected to the arms 95 at the both ends thereof. These arms 95 are mounted rotatably about the shaft 97 which is arranged between the both support plate 96 on the frame 1. Between the said arms 94 and 95 is provided a connecting member 98. As the rod end 99 secured to the said connecting member 98 is displaced in the direction marked with "R" by means of a driving power source (not shown), the second rack 88 is raised subject to the spring 100 which is adapted to act on the second rack 88 to displace the same upward and at the same time the first rack 87 is lowered, whereby the clamping members 92 and 93 make approach to each other toward the passage of the sheathed wire 6. On the other hand, as the rod end 99 is displaced in the opposite direction, the first rack 87 is lifted and the second rack 88 is lowered so that the clamping members 92 and 93 are parted away from each other. Further on the aforesaid rotating body 81 is securely arranged a mounting blacket 110. This mounting bracket 110 has a guide member 111 which is arranged rotatably about the pin 112. This guide member 111 is formed with a substantially inverted V-shaped notch 113 at the position corresponding to the said clamping members 92 and 93 and moreover is provided with a protrusion 114 at the left portion thereof (see FIG. 14). Above the said protrusion is located a cam plate 115 which is secured to the frame 1. This cam plate 115 has a cam face 116 comprising an inclination. As the said rotating member 81 is rotated in the clockwise direction in FIG. 10, as mentioned above, the guide member 111 is turned against spring force given by a spring means (not shown) in the anti-clockwise direction, as shown in dotted lines in FIG. 14, displacing in the direction marked with "S". On the contrary, when the rotating body 81 is rotated in the opposite direction, the guide member 111 is turned in the clockwise direction by means of the spring means, displacing in the direction marked with "W."

It is to be added that the reference numeral 120 in FIG. 2 and 3 denotes a particular device in which a clamp terminal is fastened to the end portion of the sheathed wire 6.

Next, operation of the wire end portion processing machine constructed in the above mentioned manner will be described below. Now it is assumed that the sheathed wire 6 supplied from the length measuring device 2 extends through the space between the clamping members 41 and 43 of the clamping device 40, then through the space between the pulleys 34 and 35 of the forwarding device 31, then through the hole 55 of the lower clamping member 52 of the clamping device 50, then through the space between the clamping face 53 and the upper clamping member 59, then through the hole 57 of the cylindrical piece 56, then through the cutting device 10, then through the space between the clamping members 92 and 93 of the clamping device 86 and finally through the notch 113 of the guide member 111. In the state of the machine as mentioned above, the sheathed wire 6 is cut and then the end portion thereof is subjected to the predetermined subsequent processing. Thereafter the upper clamping member 43 is parted away from the lower clamping member 41, while the upper clamping member 59 is parted away from the clamping face 53 of the lower clamping member 52. Further the clamping members 92 and 93 are parted away from each other, and the guide member 111 is restored to the original position as shown by the real lines in FIG. 13 and 14.

First the length measuring device 2 is actuated to forward the predetermined length of sheathed wire 6. Then the pulleys 34 and 35 of the forwarding device 31 are rotated in the directions marked with "G" and "H", whereby the sheathed wire 6 is delivered in the predetermined direction. Thus the sheathed wire 6 extending between the forwarding device 31 and the length measuring device 2 is tensioned and this tension is detected by means of a microswitch (not shown) so that the driving pulley 34 is stopped by the detecting signal issued from the said microswitch. On receiving the said detecting signal the upper clamping member 43 of the clamping device 40 is lowered and thereby the sheathed wire is clamped between the clamping members 41 and 43. Then the upper claming member 59 of the clamping device 50 is lowered so that the sheathed wire 6 is clamped between the clamping members 59 and 53. Further the clamping members 92 and 93 of the clamping device 86 make approach to each other so that the sheathed wire 6 is clamped therebetween and at the same time it is located in the center of the notch 113 of the guide member 111.

Next, the cutting device 10 is actuated so that the cutters 70 and 71 make approach to each other to cut the sheathed wire 6 and the strip cutters 73 and 75 cut up the sheathing material at the end portion of the cut sheathed wire 6, while the strip cutters 72 and 74 cut up the sheathing material at the end portion of the residual sheathed wire 6.

Next, in this state of the machine the table 25 of the moving device 8 is displaced in the direction marked with "C", whereby the sheathing material of the end portion of the residual sheathed wire 6 is peeled off. As the moving body 22 is displaced in the direction marked with "A" along the guide groove 21 of the guide member 20, the said moving body 22 is displaced in the direction marked with "Y" (forward and slightly inclined), whereby the guide member 57 comes to the position as shown by the chain lines in FIG. 4 so that the end portion of the sheathed wire 6 reaches the predetermined position of the clamp terminal fastening device 120 which in turn allows a clamping terminal to be fastened to the end portion of the residual sheathed wire 6. Thereafter the moving body 22 is restored to the original position.

Figure 10:
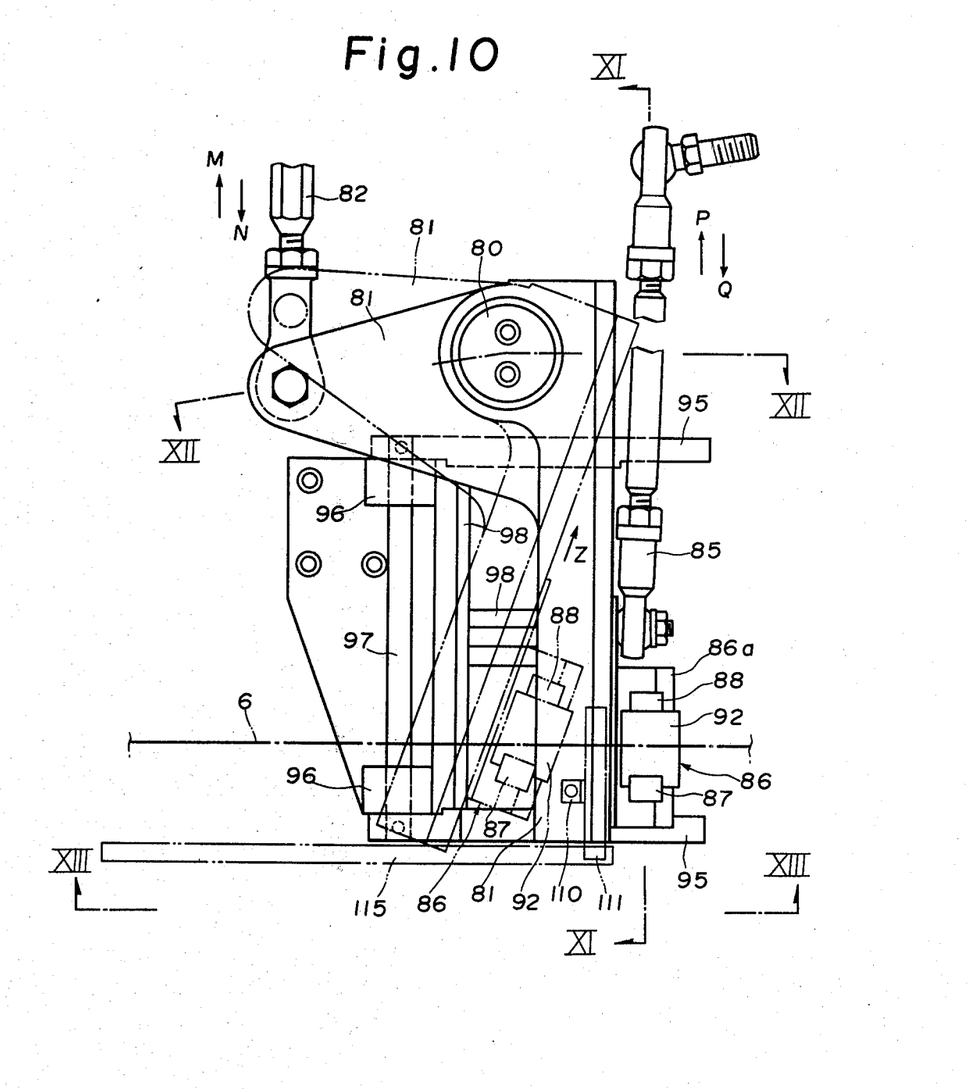
FIG. 10 is a detailed plan view of the portion of the machine marked with circle "X".
Figure 11:
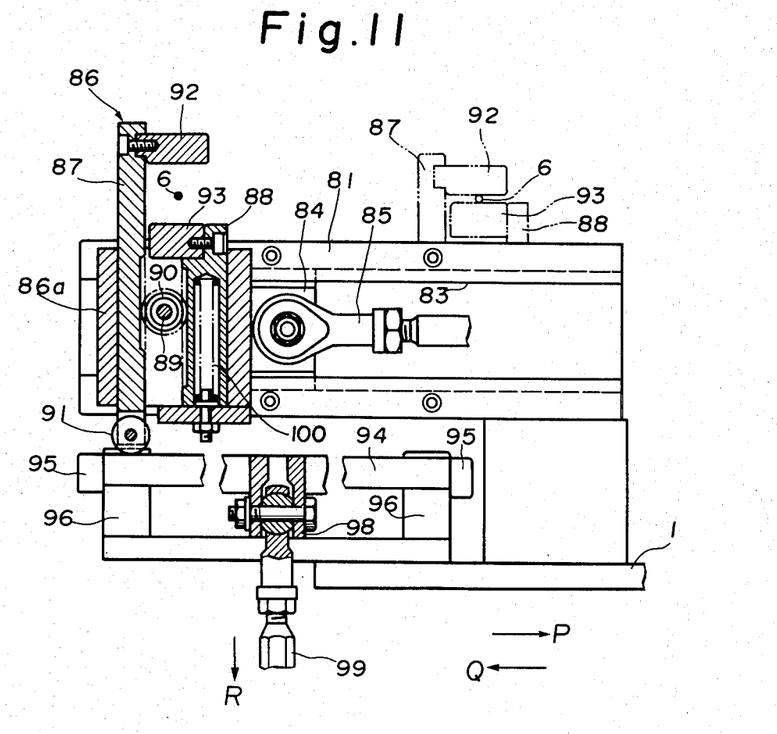
FIG. 11 is a vertical sectional side view of the portion of the machine taken in line XI—XI in FIG. 10.
Figure 12:
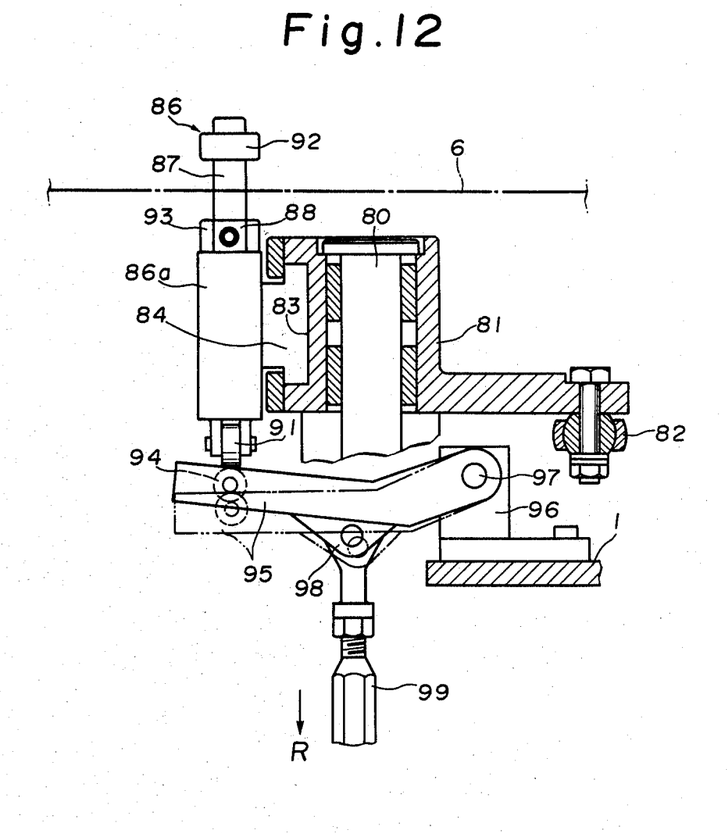
FIG. 12 is a vertical sectional view of the portion of the machine taken in line XII—XII in FIG. 10.
Figures 13, 14:
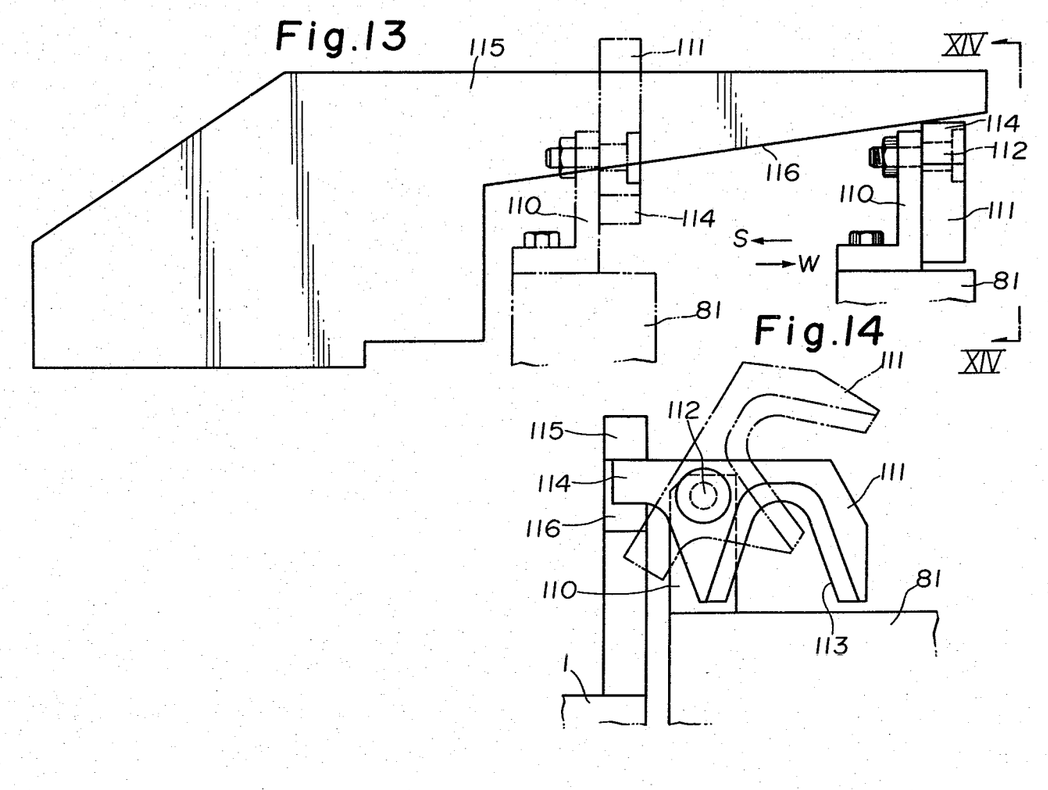
FIG. 13 is an enlarged view of the portion of the machine seen from line XIII—XIII in FIG. 10 wherein some part thereof is eliminated from illustration.
FIG. 14 is another view of the portion of the machine seen from line XIV—XIV in FIG. 13.

At the same time the rotating body 81 is rotated in the clcokwise direction in FIG. 10, whereby the sheathing material of the end portion of the said cut sheathed wire 6 is peeled off and the guide member 111 reaches the position as shown by the chain lines in FIG. 13 and 14. Next, as the movable body 84 is displaced in the direction marked with "P" along the guide groove 83 of the rotating body 81 with the machine kept in the aforesaid state, the movable body 84 is displaced in the direction marked with "Z" (rearward and slightly inclined) together with the housing 86a, whereby the clamping members 92 and 93 occupy the position as shown by the chain lines in FIG. 11. When a clamp terminal fastening device is located in that position, therefore, a clamp terminal can be fastened to the end portion of the cut sheathed wire 6 by means of the said clamp terminal fastening device. Then the clamping members 92 and 93 are parted away from each other and the cut sheathed wire 6 is removed. In the meantime the moving body 84 is restored to the original position and the rotating body 81 does so.

Next, the cutting device 10 is restored to the original position and the upper clamping member 43 is lifted away from the lower clamping member 41, while the upper clamping member 59 is also lifted away from the clamping face 53. Then the sheathed wire 6 delivered from the length measuring device 2 by the determined length thereof is forwarded in the predetermined direction by means of the pulleys 34 and 35 and thereafter the same operations as mentioned above will be repeated.

Since the machine in accordance with the present invention is constructed in the above mentioned manner such that the same comprises a forwarding device for forwarding the sheathed wire by the predetermined length, a cutting device with cutters arranged on the forwarding side of the said forwarding device and strip cutters arranged on the both sides of and adjacent to the said cutters, a first clamping device arranged intermediate the forwarding device and the cutting device, a first moving device for moving the said first clamping device away from the said cutting device along the passage of the sheathed wire, a second clamping device arranged on the wire outlet side of the cutting device and a second moving device for moving the said second clamping device away from the said cutting device along the passage of the sheathed wire, the seathing material at the end portion of the sheathed wire can be automatically peeled off.

Further, since the machine in accordance with the present invention is constructed such that the forwarding device is provided with a pair of pulley arranged opposite to each other on the both sides of the passage of the sheathed wire and a spring means which is operative to allow at the least one of the said pulleys to make approach toward the other, the sheathed wire can be smoothly forwarded in the predetermined direction for the long period of time.

Further, since the machine in accordance with the present invention is constructed such that on the wire inlet side of the said forwarding device is arranged a third clamping device which is adapted to operate to clamp the sheathed wire, when the sheathed wire is forwarded by the predetermined length by means of the said forwarding device and then the latter comes to stop, while the first clamping device is operated to clamp the sheathed wire, the sheathed wire can e forwarded without any excess of length so as to locate the same exactly at the predetermined cutting position, resulting in constant length of cut sheathed wire.

Further, since the machine in accordance with the present invention is constructed such that a cylindrical piece is detachably arranged on one side of the first clamping device opposite to the said cutting device, the inner diameter of the said cylindrical piece being a little larger than the outer diameter of the sheathed wire to be processed, the sheathed wire can be forwarded more exactly in the predetermined direction by means of the said forwarding device.

Still further, since the machine in accordance with the present invention is constructed such that the said second clamping device is provided with a pair of clamping member arranged on the both upper and lower sides of the passage of the sheathed wire in such a manner that one is moved toward or away from the other and a guide member with a substantially inverted V-shaped notch located in position in the vicinity of the said clamping members, the sheathed wire can be set exactly in the cutting position and cut to the predetermined correct and constant length.

Moreover, since the machine in accordance with the present invention is constructed such that at the least one of the said first and second clamping devices is adapted to displace the other to the predetermined position after disconnecting the latter from the cutting device, the end portion of the sheathed wire can be displaced to the predetermined position such as clamp terminal feastening device in an automatic and effective manner.

What is claimed is:

1. A sheathed wire end portion processing machine comprising a forwarding device for forwarding the sheathed wire by the predetermined length, a cutting device with cutters arranged on the forwarding side of the forwarding device and strip cutters arranged on the both sides of and adjacent to the cutters respectively, a first clamping device arranged intermediate the forwarding device and the cutting device, a first moving device for moving the first clamping device away from the cutting device along the passage of the sheathed wire, a second clamping device arranged on the wire outlet side of the cutting device, a second moving device for moving the second clamping device away from the cutting device along the passage of the sheathed wire, and a third clamping device arranged on the wire inlet side of the forwarding device and operable to clamp the sheathed wire when the sheathed wire is forwarded by a predetermined length by the forwarding device and then the latter is stopped, while the first clamping device is operated to clamp the sheathed wire.

2. A sheathed wire end portion processing machine as set forth in claim 1 wherein the forwarding device is provided with a pair of pulleys arranged opposite to each other on the both sides of the passage of the sheathed wire and a spring means which is operative to allow at least one of the pulleys to approach the other.

3. A sheathed wire end portion processing machine as set forth in claim 1 wherein the first clamping device is provided with a lower clamping member, an upper clamping device which is adapted to move toward or away from the lower clamping member and a cylindrical piece which is detachably arranged on one side of the first clamping device opposite to the cutting device, the inner diameter of the cylindrical piece being a little larger than the outer diameter of the sheathed wire to be processed.

4. A sheathed wire end portion processing machine as set forth in claim 1 wherein said second clamping device comprises a pair of clamping members which are arranged on the upper and lower sides of the passage of the sheathed wire in such a manner that one is moved toward or away from the other, and a guide member with a substantially inverted V-shaped notch for normally retaining the sheathed wire therein, said guide member being operable so as to allow said notch to become disengaged from the sheathed wire upon actuation of said second moving device.

5. A sheathed wire end portion processing machine as set forth in claim 4 wherein the pair of clamping members is secured to a pair of racks which are vertically displaceably arranged on the both sides of a pinion which is disposed therebetween, the racks being in engagement with the pinion.

6. A sheathed wire end portion processing machine as set forth in claim 1 wherein said first moving device is operable to first move said first clamping device away from said cutting device along the path of the sheathed wire and then to move said first clamping device in a direction transverse to the path of the sheathed wire.

7. A sheathed wire end portion processing machine as set forth in claim 6 wherein said first moving device comprises a moving body mounted on a frame for horizontal movement in a direction at a right angle to the path of the sheathed wire, a table mounted on said moving body for horizontal movement in a direction perpendicular to the path of movement of said moving body, a roller rotatably mounted on said table, and a swinging body pivotally mounted on the frame and having a guide groove in which said roller is received for movement therealong, whereby the pivotal movement of said swinging body causes said table to move so that said first clamping device is moved away from said cutting device, and thereafter the movement of said moving body causes said table to move along said guide groove so that said first clamping device is displaced in a direction inclined relative to the path of the sheathed wire.

8. A sheathed wire end portion processing machine as set forth in claim 1 wherein said second moving device is operable to first move said second clamping device away from said cutting device along the path of said sheathed wire and then to move said second moving device in a direction transverse to the path of the sheathed wire.

9. A sheathed wire end portion processing machine as set forth in claim 8 wherein said second moving device comprises a rotating body which is rotatably arranged in such a manner that a portion of said rotating body is reciprocatively displaced along the passage of the sheathed wire, and a moving body which is arranged on said rotating body reciprocatively displaceably in the direction at a right angle to the passage of the sheathed wire and on which said second clamping device is mounted, whereby the rotation of said rotating body causes said second clamping device to move away from the cutting device and thereafter displacement of said moving body causes said second clamping device to be displaced in a direction as inclined relative to the passage of said sheathed wire.

* * * * *